(12) United States Patent
Dunning et al.

(10) Patent No.: US 12,326,325 B2
(45) Date of Patent: Jun. 10, 2025

(54) SYSTEM AND METHOD FOR DISPENSING POWDER FOR AMMUNITION

(71) Applicant: RCBS PRECISIONEERED RELOADING, LLC, Shawnee, KS (US)

(72) Inventors: Joe Dunning, Gridley, CA (US); William Hemeyer, Lees Summit, MO (US)

(73) Assignee: RCBS PRECISIONEERED RELOADING, LLC, Overland Park, KS (US)

( * ) Notice: Subject to any disclaimer, the term of this patent is extended or adjusted under 35 U.S.C. 154(b) by 289 days.

(21) Appl. No.: 17/864,839

(22) Filed: Jul. 14, 2022

(65) Prior Publication Data

US 2023/0014061 A1 Jan. 19, 2023

Related U.S. Application Data

(60) Provisional application No. 63/221,928, filed on Jul. 14, 2021.

(51) Int. Cl.
*F42B 33/02* (2006.01)
*G01G 13/06* (2006.01)

(52) U.S. Cl.
CPC ......... *F42B 33/0292* (2013.01); *G01G 13/06* (2013.01)

(58) Field of Classification Search
CPC .................. F42B 33/0292; F42B 33/0285
See application file for complete search history.

(56) References Cited

U.S. PATENT DOCUMENTS

| | | | |
|---|---|---|---|
| 4,696,356 A | 9/1987 | Ellion et al. | |
| 6,871,439 B1 | 3/2005 | Edwards | |
| 10,982,938 B2 | 4/2021 | Hemeyer et al. | |
| 2003/0080152 A1 | 5/2003 | Balcome et al. | |
| 2017/0219326 A1* | 8/2017 | Todd | F42B 33/0292 |
| 2019/0145746 A1* | 5/2019 | Haberman | B65B 1/34 |
| | | | 222/196 |
| 2020/0011644 A1* | 1/2020 | Hemeyer | F42B 33/0285 |
| 2020/0033105 A1* | 1/2020 | Hemeyer | F42B 33/0292 |
| 2020/0064114 A1* | 2/2020 | Kinney | F42B 33/0207 |
| 2020/0393228 A1* | 12/2020 | Burke | F42B 33/0285 |
| 2021/0164751 A1 | 6/2021 | Monti et al. | |

OTHER PUBLICATIONS

International Search Report and Written Opinion for corresponding PCT International Application Serial No. PCT/US2022/37113 dated Oct. 28, 2022.

* cited by examiner

*Primary Examiner* — Jeremy Carroll
(74) *Attorney, Agent, or Firm* — AVEK IP, LLC; Kent R. Erickson

(57) ABSTRACT

A system, device and method for accurately and efficiently dispensing powder for loading ammunition. The dispenser or loader is configured to autonomously determine the powder type and the dispense rate of powder is determined for selected rotational speeds based on powder type. The most efficient dispensing regime is determined using a number of fixed speeds of barrel rotation wherein switch points among the speeds of barrel rotation, stopping points and trickle rates to approach a target weight without overshooting.

21 Claims, 10 Drawing Sheets

SYSTEM AND METHOD FOR DISPENSING POWDER FOR AMMUNITION

CROSS REFERENCE TO RELATED APPLICATIONS

This application claims the benefit of priority to U.S. patent application Ser. No. 63/221,928 filed Jul. 14, 2021, the contents of which being incorporated herein by reference in its entirety.

FIELD

The present disclosure relates to a powder dispenser for ammunition loading, and more particularly to a device for a dispensing system with increased accuracy and speed.

BACKGROUND

Experienced hunters may calibrate their firearm or sighting device for a particular trajectory pattern specific to a given powder weight. Mass-produced and packaged ammunition, however, can have inconsistent and varying powder charge weights for each bullet, even within the same production run and package. As a result, the varying weights typical to commercially produced ammunition can result in inconsistent and inaccurate shooting. These variances may be small and therefore undetectable even by an enthusiast in the field without additional equipment and analysis. Powder dispensers allow outdoor enthusiasts, such as hunters and marksmen, to weigh, fill and load their own ammunition. Each individual powder charge is typically weighed and measured to load the ammunition to a desired weight.

Highly accurate scales may be used to measure an exact powder weight for a cartridge. The fine granularity of the powder, however, still makes measuring and dispensing the exact weight within a tolerable range difficult. Traditional powder dispensers may use scales, volumes, and other measuring devices to dispense powder quickly, at the cost of accuracy. Other devices may be tuned to slowly dispense a powder for a more accurate volume, however, at the cost of expediency. Previous solutions requires the use of separate and independent devices, which required an enthusiast user to operate the two dispensers independently in series to load a single cartridge. Such ad-hoc systems, however, are time consuming, costly, and cumbersome.

SUMMARY

According to one aspect, and described herein, a powder dispenser offers a highly-accurate, and highly efficient system and method for dispensing a consistent amount of powder. A processor or controller in communication with a user interface may determine speeds at which a dispenser barrel rotates in order to dispense a volume and weight of powder from a hopper to a receptacle. A scale monitors and determines the total weight of powder dispensed into the receptacle resting on the scale. The entire assembly may be self-contained in a single integrated body.

The powder dispensing device may include a housing and a hopper sized and shaped to engage the housing to form a reservoir. A first barrel and an optional second barrel may be in fluid communication with the reservoir. At least one motor may be coupled to the first barrel and the optional second barrel and is configured to rotate the first barrel and the optional second barrel. A scale is electrically coupled to a scale plate. The scale plate may be disposed on the housing and below the first barrel and optional second barrel. A user interface may be in electrical communication with the at least one motor and the scale. The user interface may be configured to receive a user input.

An aspect of the disclosure relates to a method executable by a processor on the dispenser to perform a method for dispensing powder. The processor may be configured to operate the at least one motor according to a user input and receive a measurement from the scale. The processor may drive the barrel(s) at one or more rotational speeds according to the measurement from the scale.

The method comprises a processor controlling at least one motor to rotate a barrel or tube at a first rotational speed for a period of time to dispense powder from a hopper to a receptacle on a scale; receiving data from a sensor on the scale, the data comprising an amount of powder dispensed to the receptacle; and determining a category for the powder based on an amount of powder dispensed during the period of time.

Embodiments of the method include the following, alone or in any combination.

The method may comprise the processor determining a safe stopping point and a trickle rate regime comprising a long trickle rate and a slow trickle rate based on the category.

The method may comprise the processor controlling the at least one motor to rotate the barrel or tube at a plurality of rotational speeds to dispense powder from the hopper to the receptacle on a scale, wherein each of the plurality of speeds is run for a period of time; receiving data comprising an amount of powder dispensed to the receptacle for each of the plurality of rotational speeds; determining the dispense rate of powder based on the amount of powder dispensed and the run time for each of the plurality of rotational speeds; and determining a most effective high speed for dispensing powder.

The method may comprise the processor receiving a target weight from a user via a user interface; controlling the at least one motor to rotate the barrel or tube at one or more speeds to dispense powder based on a difference between the target weight and first, second and third weight parameters, wherein the second weight parameter is smaller than the first weight parameter and the third weight parameter is smaller than the second weight parameter, until the dispensed weight reaches the safe stopping point; and controlling the at least one motor to rotate the barrel or tube at a long trickle rate and a slow trickle rate until the target weight is reached.

When the target weight is greater than the first weight parameter, the processor may control the at least one motor to rotate the barrel or tube at a most effective high speed for dispensing powder, the most effective high speed determined from the dispense rate of powder based on the amount of powder dispensed and the run time for each of a plurality of rotational speeds; and determines switch points to a default medium speed and a default low speed based on second and third weight parameters that are each smaller than the first weight parameter.

When the target weight is between the first weight parameter and the second weight parameter, the processor may control the at least one motor to rotate the barrel or tube at a default medium speed; and determines a switch point to a default low speed based on the second and third weight parameters.

When the target weight is between the second weight parameter and the third weight parameter, the processor may control the at least one motor to rotate the barrel or tube at a default slow speed.

Another aspect provides a non-transitory computer readable medium, comprising a plurality of instructions stored thereon, the plurality of instructions configurable to be executed by a processor such that upon execution the processor is configurable to control at least one motor to rotate a barrel or tube at a first rotational speed for a period of time to dispense powder from a hopper to a receptacle on a scale; receive data from a sensor on the scale, the data comprising an amount of powder dispensed to the receptacle; and determine a category for the powder based on an amount of powder dispensed during the period of time.

Embodiments of the non-transitory computer readable medium include the following, alone or in any combination.

The processor may determine a safe stopping point and a trickle rate regime comprising a long trickle rate and a slow trickle rate based on the category.

The processor may control the at least one motor to rotate the barrel or tube at a plurality of rotational speeds to dispense powder from the hopper to the receptacle on a scale, wherein each of the plurality of speeds is run for a period of time; receive data comprising an amount of powder dispensed to the receptacle for each of the plurality of rotational speeds; determine the dispense rate of powder based on the amount of powder dispensed and the run time for each of the plurality of rotational speeds; and determine a most effective high speed for dispensing powder.

The processor may receive a target weight from a user via a user interface; control the at least one motor to rotate the barrel or tube at one or more speeds to dispense powder based on a difference between the target weight and first, second and third weight parameters, wherein the second weight parameter is smaller than the first weight parameter and the third weight parameter is smaller than the second weight parameter, until the dispensed weight reaches the safe stopping point; and control the at least one motor to rotate the barrel or tube at a long trickle rate and a slow trickle rate until the target weight is reached.

When the target weight is greater than the first weight parameter, the processor may control the at least one motor to rotate the barrel or tube at a most effective high speed for dispensing powder, the most effective high speed determined from the dispense rate of powder based on the amount of powder dispensed and the run time for each of a plurality of rotational speeds; and determine switch points to a default medium speed and a default low speed based on second and third weight parameters that are each smaller than the first weight parameter.

When the target weight is between the first weight parameter and the second weight parameter, the processor may control the at least one motor to rotate the barrel or tube at a default medium speed; and determine a switch point to a default low speed based on the second and third weight parameters.

When the target weight is between the second weight parameter and the third weight parameter, the processor may control the at least one motor to rotate the barrel or tube at a default slow speed.

Another aspect provides a powder dispensing device comprising a housing, a hopper sized and shaped to engage the housing to form a reservoir; a barrel in fluid communication with the reservoir, at least one motor coupled to the barrel, the at least one motor configured to rotate barrel, a scale electrically coupled to a scale plate, the scale plate disposed on the housing and below the barrel; a user interface in electrical communication with the at least one motor and the scale, the user interface configured to receive a user-input; and a processor configured to execute computer readable instructions to control at least one motor to rotate a barrel or tube at a first rotational speed for a period of time to dispense powder from a hopper to a receptacle on a scale; receive data from a sensor on the scale, the data comprising an amount of powder dispensed to the receptacle; determine a category for the powder based on the an amount of powder dispensed during the period of time.

Embodiments of the device include the following, alone or in any combination.

The device comprises instructions to the processor to determine a safe stopping point and a trickle rate regime comprising a long trickle rate and a slow trickle rate based on the category.

The device comprises instructions to the processor to control the at least one motor to rotate the barrel or tube at a plurality of rotational speeds to dispense powder from the hopper to the receptacle on a scale, wherein each of the plurality of speeds is run for a period of time; receive data comprising an amount of powder dispensed to the receptacle for each of the plurality of rotational speeds; determine the dispense rate of powder based on the amount of powder dispensed and the run time for each of the plurality of rotational speeds; and determine a most effective high speed for dispensing powder.

The device comprises instructions to the processor to receive a target weight from a user via a user interface; control the at least one motor to rotate the barrel or tube at one or more speeds to dispense powder based on a difference between the target weight and first, second and third weight parameters, wherein the second weight parameter is smaller than the first weight parameter and the third weight parameter is smaller than the second weight parameter, until the dispensed weight reaches the safe stopping point; and control the at least one motor to rotate the barrel or tube at a long trickle rate, a slow trickle rate or both until the target weight is reached.

When the target weight is greater than the first weight parameter, the processor controls the at least one motor to rotate the barrel or tube at a most effective high speed for dispensing powder, the most effective high speed determined from the dispense rate of powder based on the amount of powder dispensed and the run time for each of a plurality of rotational speeds; and determines switch points to a default medium speed and a default low speed based on second and third weight parameters that are each smaller than the first weight parameter.

When the target weight is between the first weight parameter and the second weight parameter, the processor controls the at least one motor to rotate the barrel or tube at a default medium speed; and determines a switch point to a default low speed based on the second and third weight parameters.

When the target weight is between the second weight parameter and the third weight parameter, the processor controls the at least one motor to rotate the barrel or tube at a default slow speed.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Aspects of the present disclosure provide a system and method for accurately and efficiently dispensing powder for loading ammunition. The dispenser or loader described herein provides a user-friendly, convenient and efficient system and method for dispensing a highly-accurate and dependable amount of powder, or charge, to fill a cartridge case. Aspects of an exemplary device are depicted in FIGS. 1-10 and described herein. The device provides a number of fixed speeds (RPM) of barrel rotation and the dispense rate (weight/time) of powder is determined for selected rotational speeds based on powder type. The terms "flow rate", "dispense rate" and "inertial flow rate" are used interchangeably herein to refer to the amount of powder dispensed over time. As used herein the term "weight" and the like is used in its colloquial sense to refer to the amount of mass of powder. Mass is the amount of matter in a material, while weight is a measure of how the force of gravity acts upon that mass. That is, the values for mass and weight are the same when measuring on the surface of the earth.

In exemplary embodiments, the loader is configured to determine which category the powder is assigned based on a first sampling test. The type of powder is used to determine switch points, stopping points and trickle rates to approach a target weight without overshooting. Additional tests are used to determine the most efficient "high" rotational speed to deliver an amount of the powder to approach a target weight. The device is further configured to determine a speed profile that selects among high, medium and slow rotational speeds and their durations to approach the stopping point where the dispensing switches from rotational delivery to trickle delivery for precise dispensing of powder.

In exemplary embodiments, the dispenser has twenty-five fixed speeds. The dispenser may use ten speeds to determine the most efficient speed for dispensing at the high speed. For example, five speeds are used for a range-finding test and five additional speeds centered around the best speed in the range-finding test to determine the most efficient speed.

Figure 1:
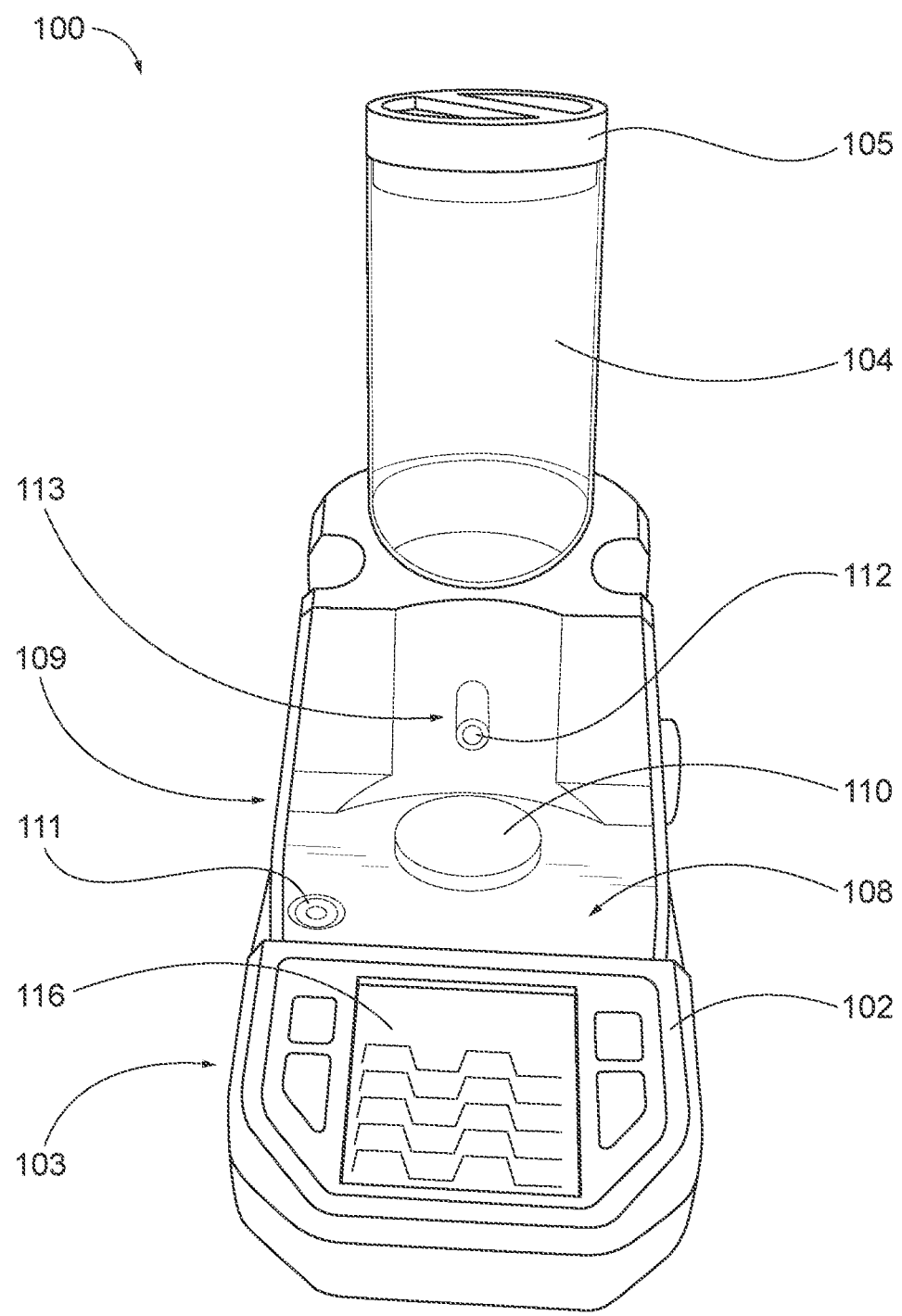
FIG. 1 depicts a front view of a powder dispenser device according to an exemplary embodiment of one aspect of the present disclosure.
Figure 2:
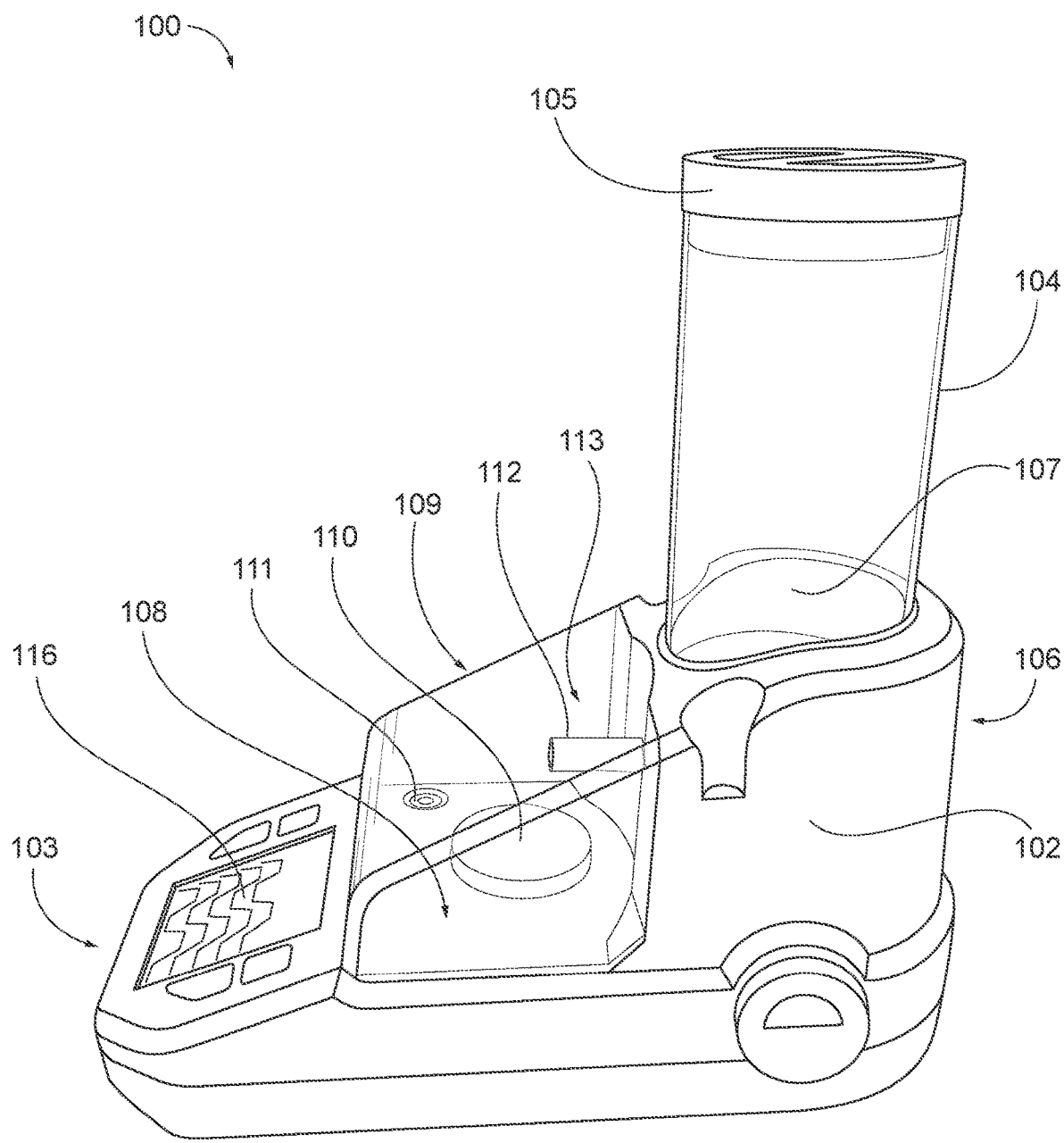
FIG. 2 depicts a side view of a powder dispenser device according to one an exemplary embodiment of aspect of the present disclosure.

FIGS. 1 and 2 depict a powder dispenser device 100 according to one aspect of the present disclosure. The device 100 may include a housing 102, a hopper 104 for powder storage, a cover 105, a user interface 116, and a barrel arrangement 113 for dispensing a weight of powder to a pan or dish (not shown) contemporaneously weighed on a high-accuracy scale plate 110. A digital user-interface 116 may be located on the first portion 103 of the housing 102, and used to program the device 100, initiate a dispensing operation, and display the current scale measurements and settings to the user.

With continued reference to FIGS. 1 and 2, the housing 102 may further include a second portion 108, the surface of which may include a scale plate 110 included in, and operatively coupled to a high-accuracy scale mechanism disposed within the housing 102. The second portion 108 may further include a leveling device 111. The leveling device 111 may include a volume partially filled with a liquid and an air bubble. The leveling device 111 may be configured such that when the housing 102 is level on a surface, the air bubble comes to rest at the center of a window of the leveling device, as viewed by the user. Leveling legs (not shown) may be coupled to the housing via a threaded screwing arrangement, or the like, that allow the leveling legs to move up and down independently to place the housing at a level resting angle should the surface on which the device 100 is resting not be level. The leveling legs may be used to adjust the height of one or more portions of the housing 102 to place the scale in a level space, thus increasing the accuracy of the scale. While a bubble level is described herein, one of skill in the art will recognize that other leveling functions may be implemented, including for example a laser level, without deviating from the scope of the disclosure. The second portion 108 internally may include scale circuitry and mechanics in connection with the scale plate 110 to provide a highly accurate weight of a volume of dispensed powder, as described herein. The scale circuitry and mechanics are further electronically coupled to the user interface 116 to receive and transmit operational settings and information, described herein. A transparent hood 109 is configured to be removably engaged to the second portion 108 to prevent ambient air currents from influencing the dispensing of powder and allow a user to remove the dispenser from the scale plate. In embodiments, the hood 109 may rest on the top of second portion 108 and over the scale plate 110. In alternative embodiments, the hood may be hingedly engaged to the housing 102. The hood 109 may be a transparent material, such as a plastic, or other polymer-based substance that allows a user to view the scale plate 110 under the hood 109.

A third portion 106 of the housing 102 may include the hopper 104 and the cover 105 sized and shaped to retain a volume of powder when inserted into a reservoir 107 defined by the housing 102. The hopper 104 may be a transparent material, such as a plastic, or other polymer-based substance that allows a user to view the current volume of powder resident in the hopper 104 and reservoir 107. The hopper 104 may be sized and shaped to be just smaller than an internal circumference or perimeter of the reservoir such that the hopper 104 rests inside the reservoir 107 via a friction fit, for easy removal and replacement. Alternatively, the hopper may be affixed to the housing in any number of known methods, including, screws, clamps, or the like. The cover 105 may be sized and shaped to provide a sealing, friction fit with the hopper 104 in order to minimize the amount of air flow into and out of the hopper. The cover may also be coupled to the hopper by other mechanisms known in the art.

The third portion 106 of the housing 102 further includes a barrel arrangement 113 configured to dispense powder from the reservoir 107 and hopper 104 to a receptacle or tray disposed on the scale plate 110. A single barrel is illustrated herein, however, it is understood that a dual-barrel arrangement may be included in some embodiments. The barrel arrangement 113 may include a first barrel 112, which is in fluid communication with the reservoir 107 and extend out of the housing 102 above the second portion 108 and above the scale plate 110. The barrel 112 may include a threaded interior surface (not shown). In some embodiments, a second barrel is present, which is in fluid communication with the reservoir 107 and extends out of the housing 102 above the second portion 108 and above the scale plate 110. Preferably, a single (first) barrel 112 and a second barrel, if present, are both oriented horizontally. When a single barrel is used, it can be rotated at selected revolutions per minute (rpm) to dispense powder at high, medium, slow and trickle speeds as discussed further below. A single motor may be operatively coupled to the single barrel 110. Alternatively, an additional motor may turn the barrel at a trickle rate. A second barrel, when present, may be used to dispense powder at a trickle rate after the dispensed powder approaches a target weight. The second barrel may be operatively coupled to the same motor that turns the first barrel, by employing a second transmission. In other embodiments, a second motor turns the second barrel at a trickle rate. Generally herein, the methods described below refer to the device illustrated in FIGS. 1, 2 and 3, wherein a single barrel is present, which is preferably turned by a single motor. However, it is to be understood that the method can be practiced using any combination of mators and barrels as described above.

The third portion 106 of the housing 102 may further include a drain assembly 132 to provide a drain path for emptying of the hopper 104 and reservoir 107. The barrel arrangement and/or drain assembly may be as described in U.S. Pat. No. 10,982,938, issued Apr. 20, 2021, which is incorporated by reference it is entirety herein for all purposes.

The electronics and mechanics of the device 100 may be coupled to a power source by a power supply line (not shown). The power supply line may be configured to receive power from a source including an alternating current (AC) source, a direct current (DC) source, or the like. When the power supply line is connected to a power source, the operation of the device 100 may be initiated by activating the power button 118.

Figure 3:
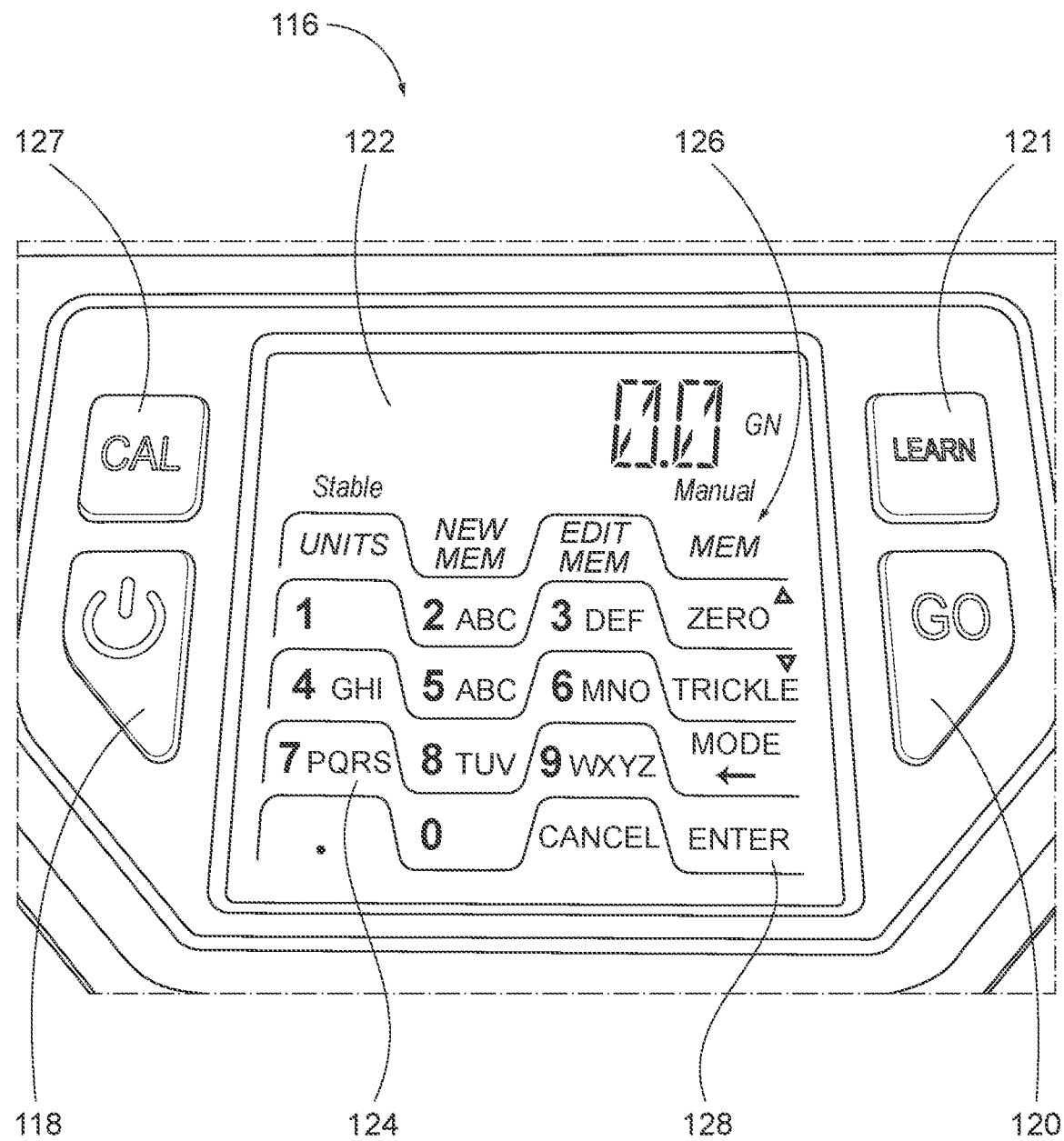
FIG. 3 depicts an expanded view of a user-interface of a powder dispenser device according to an exemplary embodiment of one aspect of the present disclosure.

FIG. 3 depicts an expanded view of the user-interface 116 according to an exemplary embodiment of an aspect of the disclosure. FIG. 3 illustrates the user interface 116, that can include a power button 118, a "Go" button 120, a "Learn" button 121 and a display 122. The power button 118 may activate the internal electronics and mechanics described herein via a power supply, internal or external. The "Go" button 120 can be configured to initiate a dispensing operation according to the parameters and settings input by a user or stored in a memory. The "Learn" button 121 can be configured to initiate a learning process according to the parameters and settings input by a user or stored in a memory, to be described in greater detail herein. The display 122 may include a keypad 124, one or more function buttons 126, as well as a visual output indicating the details associated with a dispensing operation. The display 122 may be an LCD, LED, OLED, or the like. The keypad 124, the power button 118, the "Go" button 120, the "Learn" button 121, function buttons 126 and others may include physical buttons electrically coupled to the circuitry, or may include touch sensitive indicators on the display 122. The visual output may include, without limitation, current device settings, current weight measured on the scale plate 110, or other indicators in connection with the dispensing and weighing of powder. The user interface 116 may also be coupled to the housing in a pivoting arrangement such that the user-interface may be rotated up or down to improve a user's viewing angle.

At least some of the function buttons 126 may be used to control dispensing of powder when a user wishes to use manual control of the dispensing instead of using the autonomous dispensing methods described herein. According to an exemplary embodiment of an aspect of the present disclosure, the function buttons 126 may include a button for a zero function mode, in which the scale may be zeroed and a mode button for setting a dispensing mode or other mode of operation as described herein. The function buttons 126 may also include a powder function button configured to select one of several different types of powder, i.e., flake, ball, extruded, medium extruded, large extruded, or the like. A trickle function button may be configured to activate manually the rotation of a first barrel or an optional second barrel at a trickle rate as described further below, allowing a small amount of powder to be dispensed to reach a final target rate.

A calibration button 127 may be included to allow the user to calibrate and re-calibrate the scale and device. Entering calibration mode may include placing an object of known weight on the scale plate 110 and adjust the scale via the user interface 116 to match the known weight. The user interface 116 may further include a keypad 124 and one or more function buttons 126. The power button 118 and the "Go" button 129 may be hard-coded and raised buttons while the keypad 124, function buttons 126 the unit button 125 and the calibration button 127 may be integrated into the display 122 as touch-sensitive pads. Alternative configurations, however, may be implemented including varying combinations of hard-coded and touch-sensitive buttons.

Figure 4:
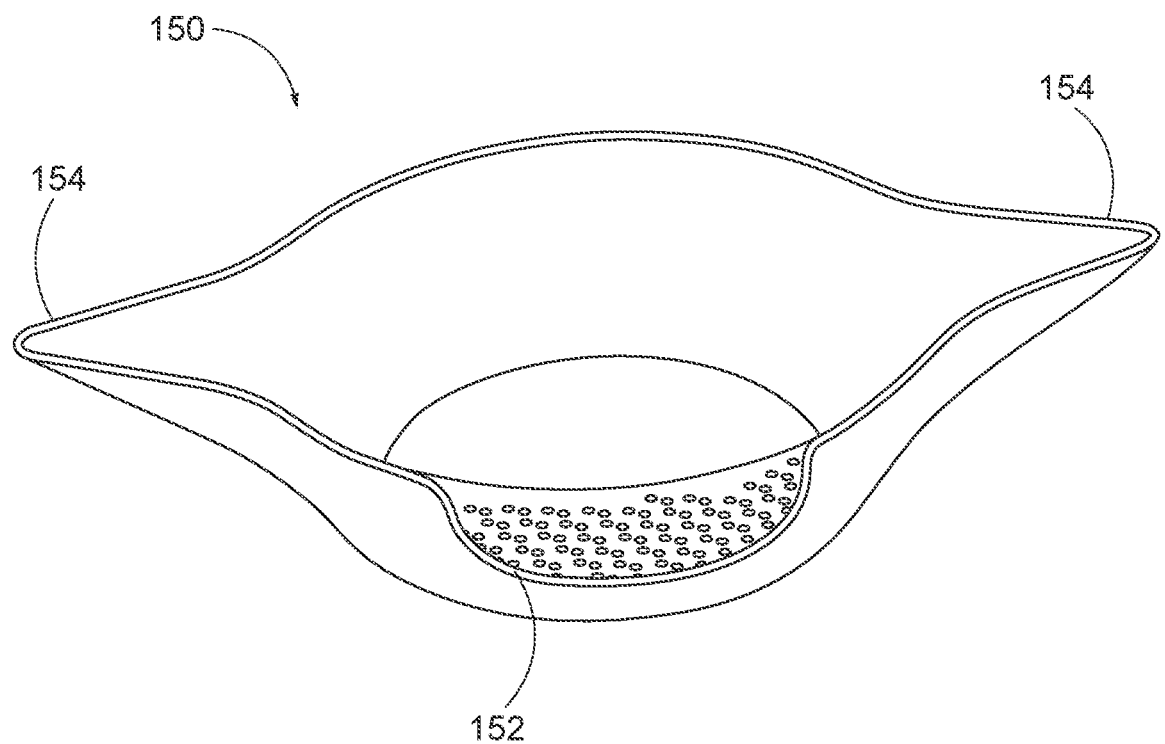
FIG. 4 depicts a perspective view of a powder tray according to an exemplary embodiment of one aspect of the present disclosure.

FIG. 4 depicts a powder receptacle 150 according to one aspect of the disclosure for receiving dispensed powder and moving it from the scale plate to load a cartridge. The powder receptacle 150 may be formed from a lightweight metal, plastic or other material and include a handle portion 152 and one or more spout portions 154. The handle portion 152 may include a raised pattern or grip to facilitate handling of the receptacle and the powder dispensed into it. The spout portions 154 may be size and shaped to facilitate the flow of powder out of the receptacle 150 and into a casing with minimal or no spillage. The receptacle 150 as described herein is exemplary and the shape and material of the receptacle may vary without deviating from the scope of the disclosure.

In operation, the device 100 may dispense a highly-accurate weight of powder through the barrel arrangement 113. The hopper 104 and reservoir 107 may be filled with the desired powder and the cover 105 placed to seal the reservoir 107 from outside contamination. With the reservoir filled, the user may power-on the device using the power button 118 on the user interface 116. A user may opt to zero the scale before beginning a dispensing operation. Zeroing the scale may include placing the receptacle on the scale plate 110 and pressing a "Zero" button, among the function buttons 126. The scale will be set to a zero weight, accounting for the weight of the receptacle, such that the weight registered by the scale represents the weight of the powder alone, and not the powder and receptacle together.

Further using the user interface 116, the user may input the desired mode, and other settings, as described herein, and press the "Go" button 120. The device, based on the input parameters will begin to dispense the powder from the reservoir 107 through the barrel arrangement 113. One or more motors may be disposed within the housing and coupled to the barrel 112. The motors may drive rotation of the barrels such that powder from the reservoir 107 may flow into the internal portion 121 of the barrel 112. The rotation of the barrel may create a flow of powder from the reservoir, through the barrels and into the receptacle resting on the scale plate. The speed at which the barrels rotate may dictate the rate at which the powder flows from the reservoir into the barrels and out to the receptacle.

Figure 5:
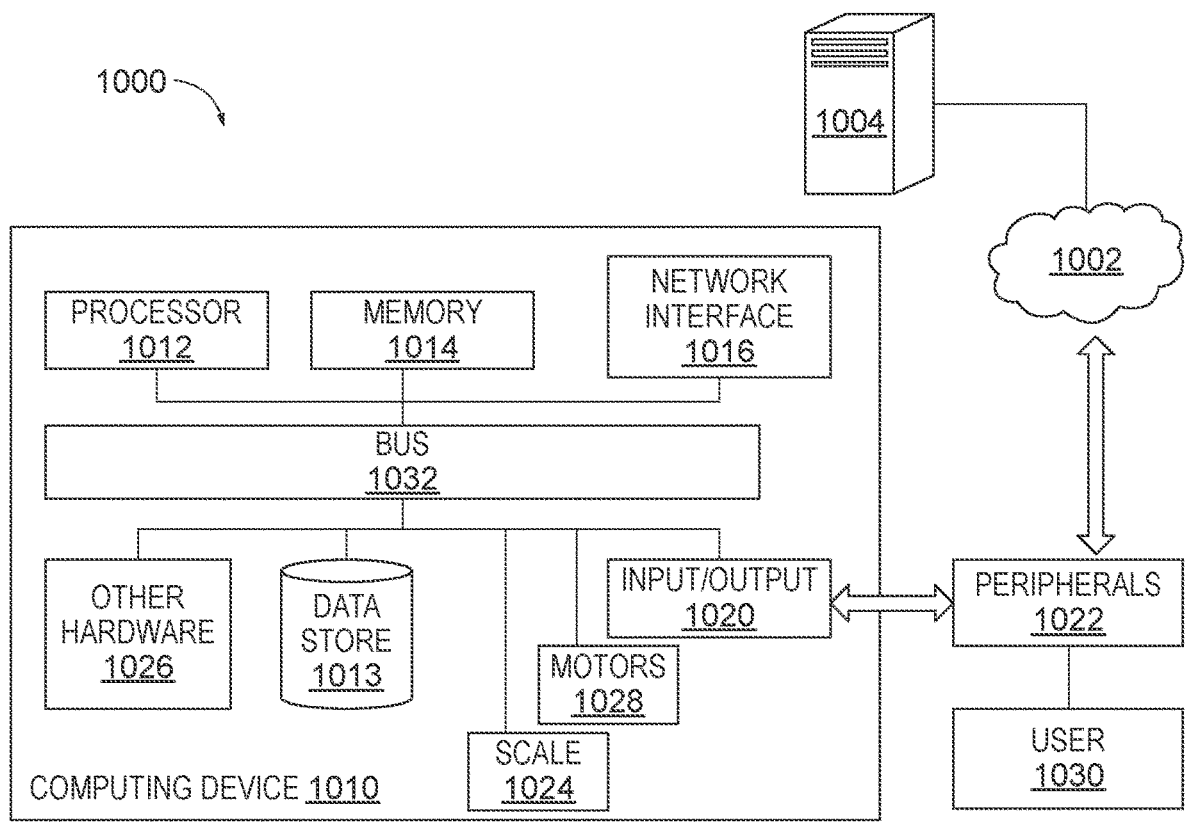
FIG. 5 depicts a hardware architecture of a powder dispenser device according to an exemplary embodiment of an aspect of the present disclosure.

The device 100 may include a computing system 1000, as depicted in FIG. 5, to receive inputs and drive the operation of the device 100. In general, the computing system 1000 may include a computing device 1010, such as a special-purpose computer designed and implemented for directing and controlling the operation and provision of powder. The computing device 1010 may be or include data sources, client devices, and so forth. For example, the computing device may include the components depicted schematically in FIG. 5.

1010 may include a microprocessor installed and disposed within a device. In certain aspects, the computing device 1010 may be implemented using hardware or a combination of software and hardware.

The computing device 1010 may communicate across a network 1002. The network 1002 may include any data network(s) or internetwork(s) suitable for communicating data and control information among participants in the computing system 1000. This may include public networks such as the Internet, private networks, and telecommunications networks such as the Public Switched Telephone Network or cellular networks using cellular technology and/or other technologies, as well as any of a variety other local area networks or enterprise networks, along with any switches, routers, hubs, gateways, and the like that might be used to carry data among participants in the computing system 1000. The network 1002 may also include a combination of data networks and need not be limited to a strictly public or private network.

The computing device 1010 may communicate with an external device 1004. The external device 1004 may be any computer or other remote resource that connects to the computing device 1010 through the network 1002.

In general, the computing device 1010 may include a processor 1012, a memory 1014, a network interface 1016, a data store 1018, and one or more input/output interfaces 1020. The computing device 1010 may further include or be in communication with peripherals 1022 and other external input/output devices that might connect to the input/output interfaces 1020.

The processor 1012 may be any processor or other processing circuitry capable of processing instructions for execution within the computing device 1010 or computing system 1000. The processor 1012 may include a single-threaded processor, a multi-threaded processor, a multi-core processor and so forth. The processor 1012 may be capable of processing instructions stored in the memory 1014 or the data store 1018.

The memory 1014 may store information within the computing device 1010. The memory 1014 may include any volatile or non-volatile memory or other computer-readable medium, including without limitation a Random-Access Memory (RAM), a flash memory, a Read Only Memory (ROM), a Programmable Read-only Memory (PROM), an Erasable PROM (EPROM), registers, and so forth. The memory 1014 may store program instructions, program data, executables, and other software and data useful for controlling operation of the computing device 1010 and configuring the computing device 1010 to perform functions for a user.

The memory 1014 may include a number of different stages and types of memory for different aspects of operation of the computing device 1010. For example, a processor may include on-board memory and/or cache for faster access to certain data or instructions, and a separate, main memory or the like may be included to expand memory capacity as desired. All such memory types may be a part of the memory 1014 as contemplated herein.

The memory 1014 may, in general, include a non-volatile computer readable medium containing computer code that, when executed by the computing device 1010 creates an execution environment for a computer program in question, e.g., code that constitutes processor firmware, a protocol stack, a database management system, an operating system, or a combination of the foregoing, and that performs some or all of the steps set forth in the various flow charts and other algorithmic descriptions set forth herein. While a single memory 1014 is depicted, it will be understood that any number of memories may be usefully incorporated into the computing device 1010.

The network interface 1016 may include any hardware and/or software for connecting the computing device 1010 in a communicating relationship with other resources through the network 1002. This may include remote resources accessible through the Internet, as well as local resources available using short range communications protocols using, e.g., physical connections (e.g. Ethernet), radio frequency communications (e.g., Wi-Fi, Bluetooth), optical communications, (e.g., fiber optics, infrared, or the like), ultrasonic communications, or any combination of these or other media that might be used to carry data between the computing device 1010 and other devices. The network interface 1016 may, for example, include a router, a modem, a network card, an infrared transceiver, a radio frequency (RF) transceiver, a near field communications interface, a radio-frequency identification (RFID) tag reader, or any other data reading or writing resource or the like.

The network interface 1016 may include any combination of hardware and software suitable for coupling the components of the computing device 1010 to other computing or communications resources. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple to other local devices, or to connect to a local area network or the like that is in turn coupled to a data network 1002 such as the Internet. This may also include hardware/software for a WiMax connection or a cellular network connection (using, e.g., CDMA, GSM, LTE, or any other suitable protocol or combination of protocols). The network interface 1016 may be included as part of the input/output devices 820 or vice-versa.

The data store 1018 may be any internal memory store providing a computer-readable medium such as a disk drive, an optical drive, a magnetic drive, a flash drive, or other device capable of providing mass storage for the computing device 1010. The data store 1018 may store computer readable instructions, data structures, program modules, and other data for the computing device 1010 or computing system 1000 in a non-volatile form for relatively long-term, persistent storage and subsequent retrieval and use. For example, the data store 818 may store an operating system, application programs, program data, databases, files, and other program modules or other software objects and the like.

The input/output interface 1020 may support input from and output to other devices that couples to the computing device 1010. This may, for example, include the user interface, serial ports (e.g., RS-232 ports), universal serial bus (USB) ports, optical ports, Ethernet ports, telephone ports, audio jacks, component audio/video inputs, HDMI ports, and so forth, any of which might be used to form wired connections to other local devices. This may also include an infrared interface, RF interface, magnetic card reader, or other input/output system for wirelessly coupling in a communicating relationship with other local devices. It will be understood that, while the network interface 1016 for network communications is described separately from the input/output interface 1020 for local device communications, these two interfaces may be the same, or may share functionality, such as where a USB port is used to attach to a Wi-Fi accessory, or where an Ethernet connection is used to couple to a local network attached storage.

The computing device may include or communicate with motors 1028 to drive the physical operation of the barrel assembly. The motors 1028 may be driven by the processor 1012 according to parameters and inputs from the user, user interface and input/output 1020. The motors may also operate in conjunction with the scale 1024, which may be operatively connected to the processor to measure and record weight measurements from the scale plate 110 during a dispensing operation. The scale 1024 may include an electromagnetic type or load cell type scale. The processor 1012 may drive the motors 1028 to dispense powder responsive to readings from the scale 1024 to reach a desired target weight of powder.

A peripheral 1022 may include any device used to provide information to or receive information from the computing device 1010. This may include human input/output (I/O) devices such as a keyboard, a mouse, a mouse pad, a track ball, a joystick, a microphone, a foot pedal, a camera, a touch screen, a scanner, mobile device or other device that might be employed by the user 1030 to provide input to the computing device 1010 via the user interface. This may also or instead include a display, a printer, a projector, a headset or any other audiovisual device for presenting information to a user. The peripheral 1022 may also or instead include a digital signal processing device, an actuator, or other device to support control of or communication with other devices or components. In one aspect, the peripheral 1022 may serve as the network interface 1016, such as with a USB device configured to provide communications via short range (e.g., Bluetooth, Wi-Fi, Infrared, RF, or the like) or long range (e.g., cellular data or WiMax) communications protocols. In another aspect, the peripheral 1022 may augment operation of the computing device 1010 with additional functions or features, such as a global positioning system (GPS) device, or other device. In another aspect, the peripheral 1022 may include a storage device such as a flash card, USB drive, or other solid-state device, or an optical drive, a magnetic drive, a disk drive, or other device or combination of devices suitable for bulk storage. More generally, any device or combination of devices suitable for use with the computing system 1000 may be used as a peripheral 1022 as contemplated herein.

Other hardware 1026 may be incorporated into the computing system 1000 such as a coprocessor, a digital signal processing system, a math co-processor, a graphics engine, a video driver, a camera, a microphone, speakers, and so forth. The other hardware 1026 may also or instead include expanded input/output ports, extra memory, additional drives, and so forth.

A bus 1032 or combination of busses may serve as an electromechanical backbone for interconnecting components of the computing device 1010 such as the processor 1012, memory 1014, network interface 1016, other hardware 1026, data store 1018 input/output interface 1020, and motors 1028. As shown in the figure, each of the components of the computing device 1010 may be interconnected using a system bus 1032 in a communicating relationship for sharing controls, commands, data, power, and so forth. In non-limiting embodiments, the memory may have settings for up to 50 dispensing protocols based on powder type and target weights.

Figure 6:
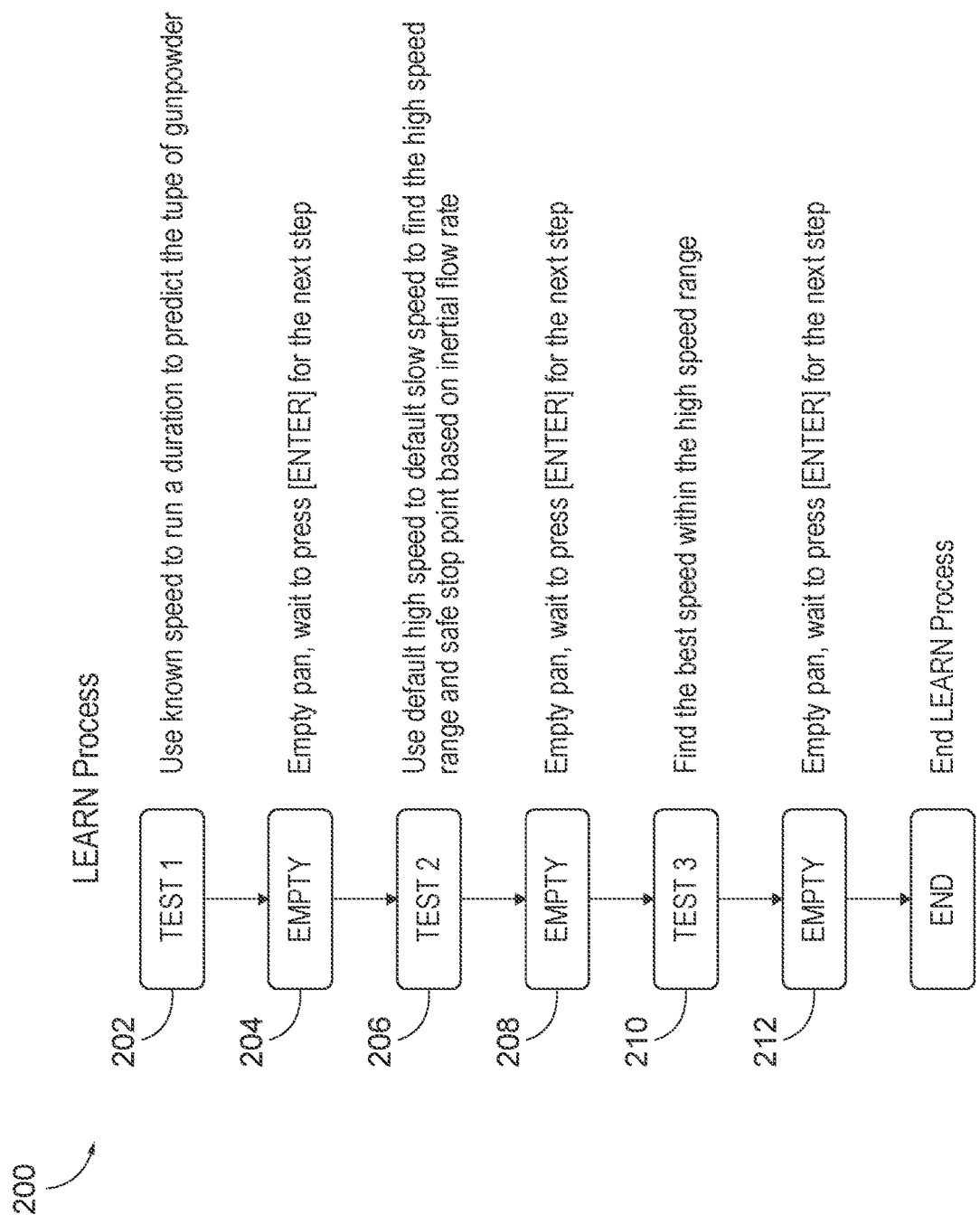
FIG. 6 depicts a flow chart of a learn process according to an exemplary embodiment of an aspect of the present disclosure.
Figure 7:
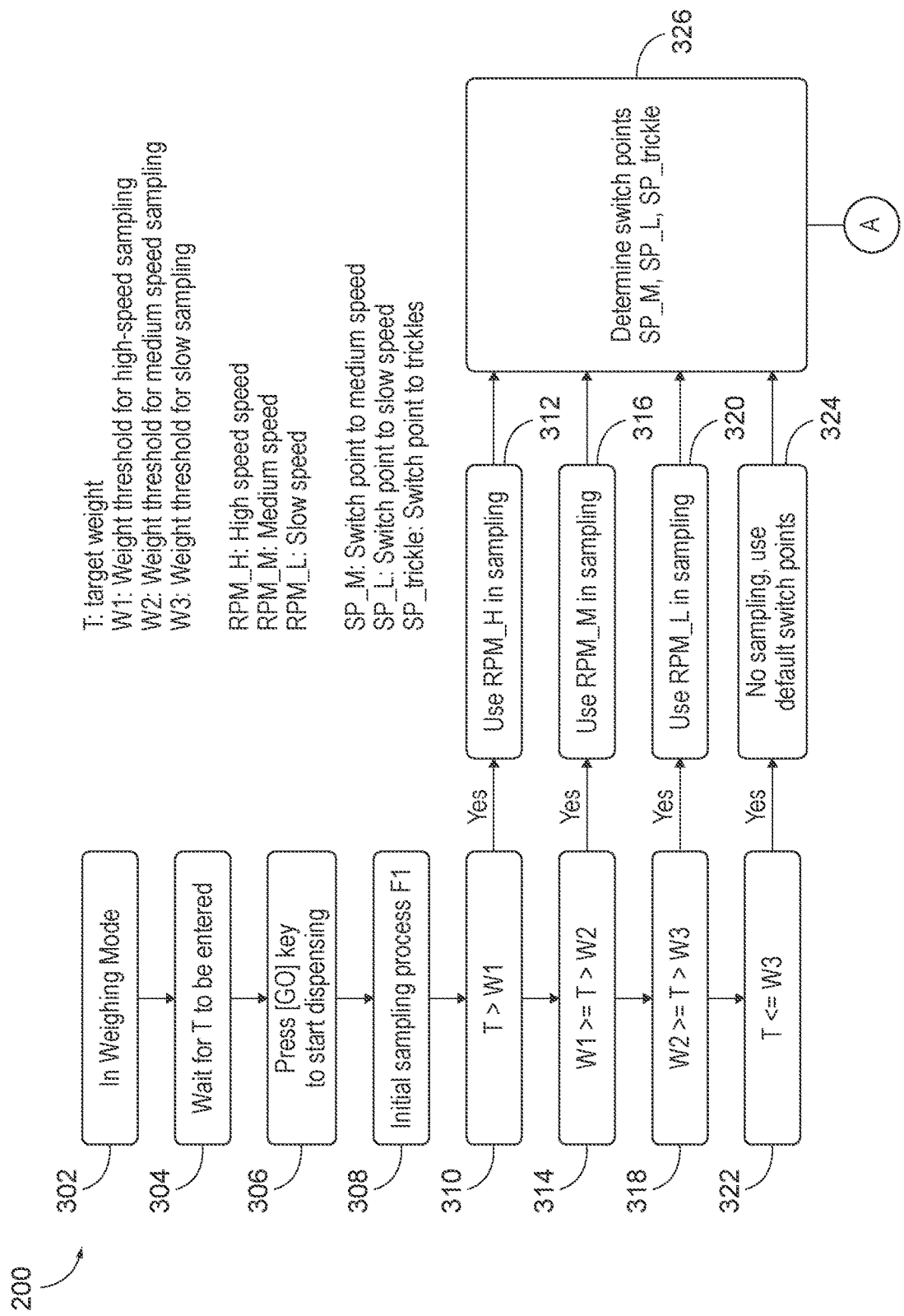
FIGS. 7-10 depict flow charts of dispense processes according to exemplary embodiments of aspects of the present disclosure.

A Learn process is described herein with reference to FIG. 6. In an early stage in the process, powder is loaded into the hopper 104, and the cover 105 secured to the hopper. The Learn process is initiated by depressing the "Learn" button 121 on the user interface. In some embodiments, the Learn process 200 can include three stages, or "tests."

At Test 1 (Step 202), the motor may be run at two known speeds to dispense the powder and predict the type of gunpowder used, designated "X." For example, Test 1 includes priming the dispensing tube, e.g., rotating the barrel at 312 RPM for 10 seconds, then rotating the barrel at 140 RPM for 10 seconds. The powder is dispensed at the known speed (e.g. 140 RPM) for 10 seconds. The time taken to deliver the unspecified weight at the known rotational speed is indicative of the type of powder loaded in the dispenser. In embodiments, depending on the dispense rate determined during Test 1, the processor will classify powders to one of two types: Quick type (Ball, Extruded or Large Extruded) or Slow type (Flake). The weights of different types of powder for a given speed and duration may be stored in a look-up table or other memory to compare results from Test 1. At the end of Test 1, the user is prompted at step 204 to empty the powder receptacle 150. The word "EMPTY" is displayed on the display 122. The system then waits for the user to depress the "ENTER" key 128 on Display 126.

Test 1 determines whether the powder is a slow or quick dispense powder, which is then used to set the trickle "rate" and safe stop point, designated "Z", (which are linked) based on either the slow or quick type of powder. After Test 1, the Test 1 result value will show on the display, which will classify powders to 2 types: Quick type (Ball, Extruded or Lg. Extruded) or Slow type (Flake). There are two separate sets of settings for trickles and safe stop point (Z), which are fixed regardless of target weight. That is, the slow trickle (Ts) and stop point (Zs) are selected for slow powders or quick trickle (Tq) and stop point (Zq) are selected for quick powders based on the results of Test 1. The safe stop point is a defined weight, based on the type of powder, that will be subtracted from a target weight to define the point where rotation of the barrel(s) are switched from rotational dispensing speeds to a trickle regime. Slow type (Flake) generally does not overcharge so the slow trickle regime provides large trickle angles and small safe stop point. Quick type (Ball, Extruded or Lg. Extruded) would be trickled with smaller trickle angles and larger safe stop points to minimize the chance of overcharging.

The Learn process 200 continues with Test 2 (Step 206), in which a predetermined high speed and a predetermined slow speed are used to find the speed range, designated "LRN_M" through "LRN_L" based on the inertial flow rate or dispense rate of the powder, the weight of powder delivered for a time at a given rotation rate (speed).

In some embodiments, the tube or barrel 112 will rotate at high RPM's, e.g., for 5 seconds and pause for 5 seconds, followed by a second session slightly slower for 5 seconds and pause for 5 seconds, a third session at medium RPM for 5 seconds and pause for 5 seconds, a fourth session at a slower RPM for 5 seconds and pause for 5 seconds, and a fifth session at a slow RPM for 5 seconds. Five fixed speeds (for example, 350, 300, 250, 200 and 150 RPM) running from high to low) may be used for Test 2. In another embodiment, five successively increasing RPMS may be used, e.g., 274 RPM, 324 RPM, 365 RPM, 405 RPM and 430 RPM. There may be no practical difference whether the speeds are tested from high to low or low to high, or even randomly among the five speeds selected. High to low speed ranging in Test 2 is generally used to ensure powder has filled up the tube. Without being bound by theory, it has been found that dispense rate increases as RPM increases until a maximum efficient dispense rate is reached, where the dispense rate levels off or may even decline. At the end of Test 2, the user is prompted at step 208 to empty the powder receptacle 150. The word "EMPTY" is displayed on the display 122. The system then waits for the user to depress the "ENTER" button.

At Test 3 (Step 210) the learn process determines the maximum efficient speed within the high speed range, designated "LRN_H." In Test 3, the processor will select a narrower range of speeds centered around the best dispense rate determined in Test 2. For example, if Test 2 determines a speed of 250 RPM has the highest effective dispense rate, Test 3 may use 230, 240, 250, 260, 270 RPM running from low to high. In some embodiments, the tube or barrel 112 will rotate at a first RPM for 5 seconds, followed by a second session slightly faster for 5 seconds, a third session slightly faster for 5 seconds, a fourth session slightly faster for 5 seconds, and a fifth session slightly faster for 5 seconds. In Test 2 and Test 3, the processor finds the best (most efficient) high speed for dispensing the powder. Medium speed (rpm=140) and slow speed (rpm=40) are fixed. That means that if the target weight is small, it will not run the best high speed, and it will select medium speed, slow speed or trickles depending on how far it is away from the target weight, as discussed below. At the end of Test 3, the user is prompted at step 212 to empty the empty powder receptacle 150. The word "EMPTY" is displayed on the display 122. The system then waits for the user to depress the "ENTER" button 128. The Learn process is completed.

If LEARN is run, the barrel would not need to be primed because the Tests 1, 2 and 3 have already filled the barrel. If LEARN is not run and the barrel is empty, the first dispensed charge will take longer because the barrel is empty. All succeeding dispenses will be more consistent.

After running the LEARN process, the results are saved in local LEARN. User 1030 can edit or add to MEM or select LEARN as mentioned in the instructions. In embodiments, "DISP" will flash and then the display will show "Normal". Using the MODE key, one can toggle between "Normal" and "Learn" and press ENTER to save and end-configure New Memory. The dispenser will display the number of the memory that has been saved (e.g. NO 001-50). The User can press "GO" to start dispensing the saved memory or press ENTER and the dispenser will flash through all the parameters of the saved memory and stop at NO 0001-50.

If LEARN is selected, the parameters of local LEARN will saved in, for example, MEM002 separately and independent of local LEARN. So when the user runs the next LEARN process, new local LEARN parameters will be created, but that will not affect MEM002. So a user can recall MEM002 whenever he needs. Changing environmental factors (e.g. temperature, humidity) may mean a user may choose to do LEARN at each session unless he has a generally stable environment for his loading, in which case he may recall a saved procedure from memory. A user may choose to re-do LEARN again whenever it does not run well and then save those results into memory such as MEM 001 to MEM 050.

FIGS. 7-10 illustrate the Dispense process 300 used to dispense the powder after the Learn process 200 has been completed. At step 302, the dispenser 100 is placed in "weighing mode." At step 304, the user interface 116 waits for T, the target weight to be entered. Users choose which dispensing mode in the MODE menu setting before they start to dispense. When users press [LEARN] key for 3 sec to run LEARN process, the loader starts Test 1, Test 2, Test 3 and then shows "END" at the end of LEARN process. It is automatically set to LEARN dispensing mode. So after BOX 304 "enter target weight" and BOX 306 "press [Go] key", the whole dispensing process is handled by the loader until/unless users press [CANCEL] to interrupt. In Block 336, loader automatically selects LEARN or NORMAL route depending on the loader's dispensing mode setting. The user depresses the "GO" button 120 at step 306 to begin the dispensing. The initial sampling process 308 is initiated. In example embodiments, while in dispensing mode, the processor will take a quick sample in the first three seconds. The sampling allows the processor to calculate the theoretical switch points for medium speed, slow speed, stop point for slow speed (or start point for long trickle) and start point for short trickle as described in the F1 process. Those calculations are based on parameters of quick or slow powder type. If the target weight T is greater than a pre-determined threshold for high speed sampling W1 (Step 310), a predetermined high speed RPM_H is used for sampling (Step 312). If the target weight T is less than or equal to the pre-determined threshold for high speed sampling W1 and less than the pre-determined threshold for medium speed sampling W2 (Step 314), a predetermined medium speed RPM_M is used for sampling (Step 316). If the target weight T is less than or equal to the pre-determined threshold for medium speed sampling W2 and less than the pre-determined threshold for slow sampling W3 (Step 318), a predetermined slow speed RPM_L is used for sampling (Step 320). If the target weight T is less than or equal to the pre-determined threshold for slow sampling W3 (Step 322), no sampling is performed and default switch points are used. In embodiments, W1, W2 and W3 are arbitrary and unchanging. They are independent of quick or slow powder type from Test 1. In LEARN, the three speeds are high (best RPM determined from Test 2 and Test 3), medium (140 rpm) and slow (40 rpm). If T>W1, that means the target weight is very large so it is safe to sample at the best RPM determined in Test 3. The processor calculates the current dispense rate at best rpm. If T≤W3, that means target weight is very small and does not have time to sample (or calculate the current dispense rate) and the processor will use the default switch points.

If W2≥T>W3, that means target weight is small but still has a chance to sample in slow speed to calculate the current dispense rate at slow speed. In embodiments, slow speed is always 40 rpm. The processor calculates the current dispense rate at slow speed. From the dispense rate here, it determines switch points for slow speed, long trickle and short trickle. It will run slow speed until reaching the slow speed stop point (or the start point long trickle).

Based on the relation between the target weight T and the weight thresholds in boxes 310, 314, 318 and 322, a sampling at a selected speed is done in one of boxes 312, 316, 320 and 324. In embodiments, the sampling time is fixed at three seconds. Once the target weight is reached, dispensing is completed for that run.

Box 326 determines switch points mainly based on the dispense rate calculated during sampling and the current gap to target weight (T-W). Sampling continues and the dispense rate is calculated even in medium speed and slow; therefore switch points are continuously updated.

For example, if target weight T is >8 grains (gn), the dispenser will run at the high speed to check its dispense rate or double check on quick/slow powder type. Then it will run at the maximum speed determined from Test 3 and switch to medium speed and then slow speed based on the weighing parameters. If target weight T is ≤8 gn, it will sample at medium speed.

At step 326, the switch points are determined, i.e., SP_M switch point to medium speed, SP_L switch point to slow speed and SP_trickle, switch point to trickles.

Figure 8:
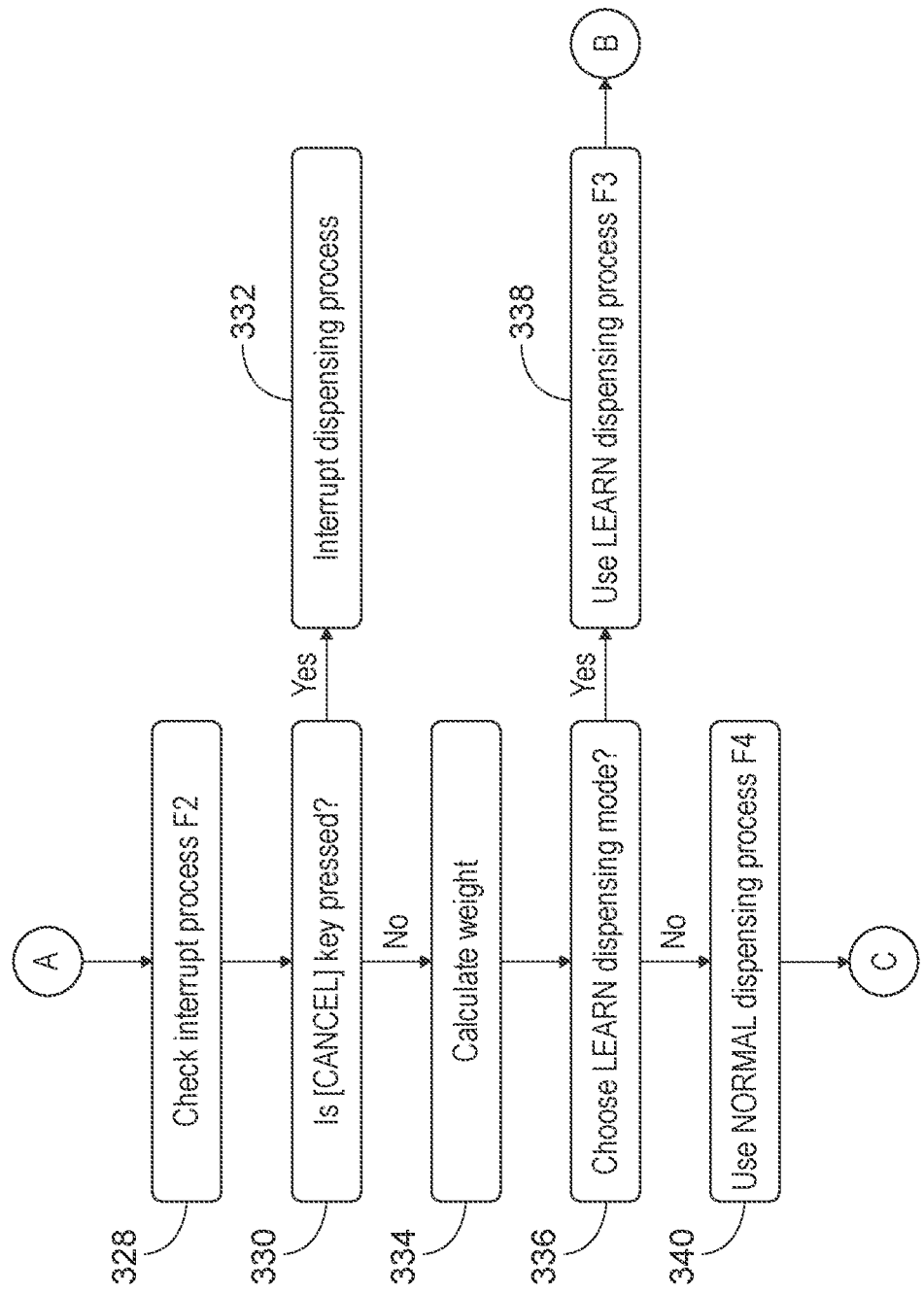

With reference to FIG. 8, the process includes a check/interrupt process F2 (Step 328). The user interface 116 checks at step 330 to determine if the "CANCEL" key has been depressed. If it has been depressed, the dispensing process is interrupted at step 332. This allows users to interrupt the dispensing process by pressing the [CANCEL] key. Users may initiate interrupt/cancel to switch to another powder or to change to a new target weight while dispensing in AUTO mode (as shown in box 332). When dispensing is interrupted by pressing [CANCEL], it returns to weighing mode. If users want to keep dispensing with previous target weight, users can press [Go] key to resume to dispensing. Or users can enter a new target weight and start dispensing with the new target weight. If the "CANCEL" key has not been depressed, the weight is calculated at step 334. Weight is continuously calculated and updated during dispensing. Before step 336, NORMAL and LEARN follows the same steps. At step 336, the processor checks to determine whether the user has selected the dispensing mode. If the user has selected the "LEARN DISPENSING MODE F3," the process continues to step 338 and moves to "B" in FIG. 9. If the user had not selected the "LEARN DISPENSING MODE F3," the process continues to step 340 and moves to "C" for the NORMAL dispensing process F4 shown in FIG. 10.

Figure 9:
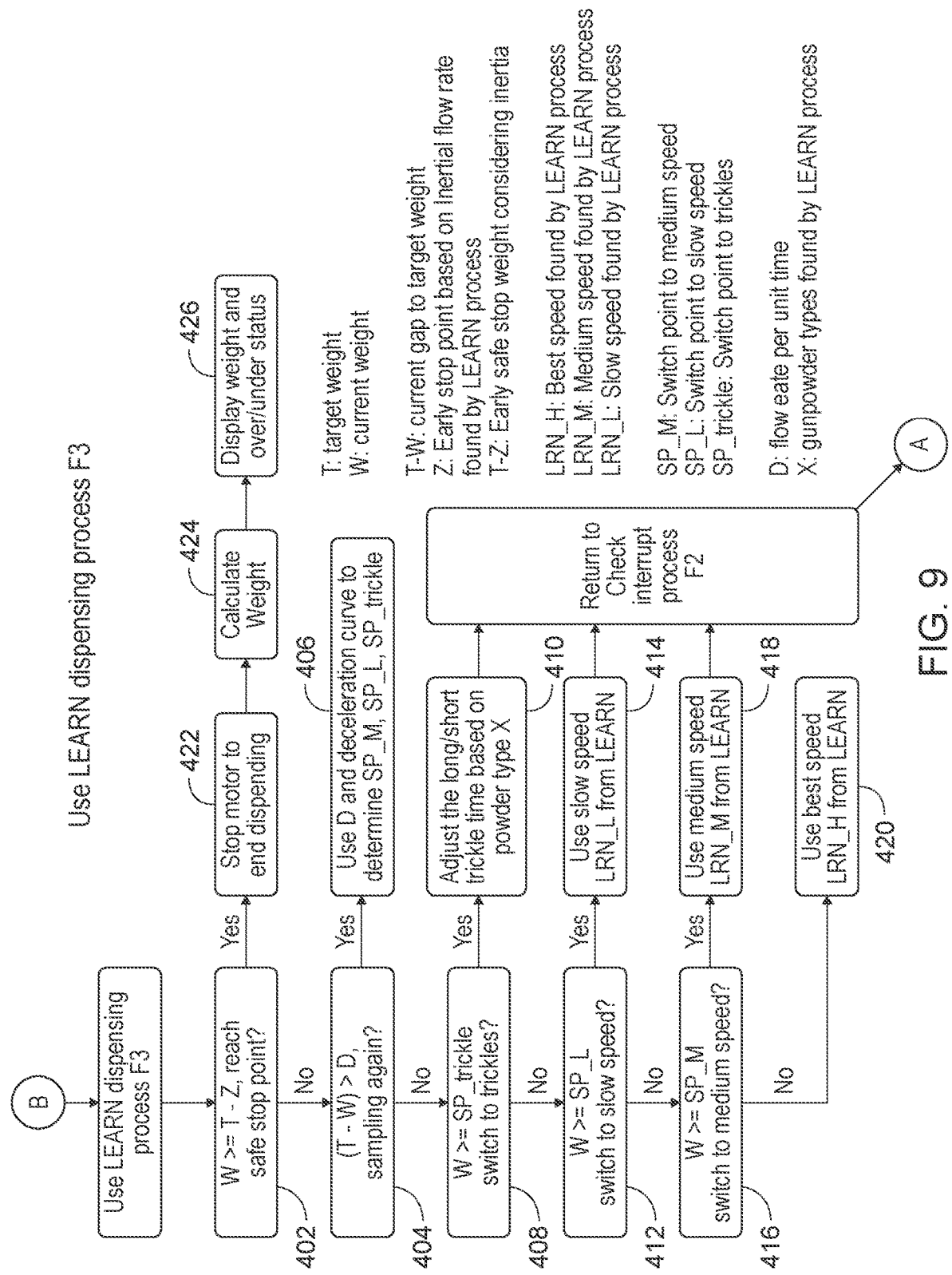

The LEARN DISPENSING MODE F3 is illustrated in FIG. 9. After the motor is stopped, some powder may keep rolling down the tube or barrel, so Z is an early safe stop point to account for any powder dispensed after the motor is stopped to minimize overweight dispenses. The stop point stops rotation of the barrel(s) and then starts turning the barrel(s) using a trickle rate. In embodiments with a single barrel, this means that the at least one motor stops rotating the barrel and then, after a brief pause to allow powder to stop dispersing from the barrel, restarts turning the barrel at a trickle rate. As discussed above, a single motor may rotate the barrel at the high, medium, and slow speeds and during the trickle rates. In other embodiments, a first motor may rotate the barrel at the high, medium, and slow speeds and a second motor may turn the barrel during the trickle rates. In dual-barrel embodiments, a first motor may rotate the first barrel at the high, medium, and slow speeds and a second motor may turn the second (trickle) barrel during the trickle rates.

At step 402, if the weight W is greater than or equal to the difference between the target weight T and the early stop point Z determined by the LEARN process in Test 1, this means that the dispensed weight has approximately reached the target weight. The motor is stopped to end dispensing, the weight is calculated and the weight is displayed, along with the over/under status.

At step 404, if the difference between the target weight T and the weight is greater than the flow rate/unit time D, at step 406, the flow rate/unit time D and the predetermined deceleration curve used to determine/modify the switch points, i.e., SP_M switch point to medium speed, SP_L switch point to slow speed and SP_trickle, switch point to trickles. The deceleration curve is composed of switch points for medium speed, slow speed, long trickle, short trickle and target weight. Notably, there are no pauses at switch points, providing an uninterrupted speed profile. It pauses only in trickles and pause(s) might get longer if scale is unstable. That means it will only trickle again only if scale is stable.

At step 408, if the weight W is greater than or equal to SP_trickle, switch point to trickles, then at step 410, the long/short trickle time is adjusted based on the powder type X (determined in Test 1). Trickles are fixed and depending on if it is Slow (flake) type or Quick (Ball, Extruded or Lg. Extruded) type. Quick and Slow are two separate but fixed sets of settings for trickles and safe stop point (Z).

At step 412, if the weight W is greater than or equal to SP_L switch point to slow speed, then at step 414, the slow speed LRN_L from the Learn process is used. As described above, in embodiments, the slow speed is set at 40 RPM.

At step 416, if the weight W is greater than or equal to SP_M switch point to medium speed, then at step 418, the medium speed LRN_M from the Learn process is used. As described above, in embodiments, the medium speed is set at 140 RPM.

Otherwise, at step 420, the best speed LRN_H from the Learn process is used. Thereafter, the process returns to the check interrupt process at step 328 to check if the CANCEL button has been pressed by the user.

Depending on the target weight and loader operating parameters, the dispensing process desirably passes through all speed regimes: Fast, Medium, Slow, Long Trickle to Short Trickle. However, sometimes, the dispensing will pass switch points or stop/start points. Some stages may be skipped. For example, it may run at slow speed but slow speed stops very close to the target weight, so the processor skips long trickle and starts short trickles.

High, medium and slow speeds are based on the barrel continuously rotating at the indicated speed. Trickle rates are different, in that trickle rates rotate the barrel slowly for brief periods of time followed by pauses to allow for powder particles to fall onto the pan and be weighed before additional particles are dispensed. Based on the powder type determined in Test 1, trickle rates may adjust rotating time, response time and/or stop point for long and short trickles. If the tube RPM is the same for all powders, Flake powder will dispense the slowest, then Ball and Extruded are the fastest. The larger the Extruded powder the faster it will dispense. This is why powder type is important, especially for the Long (Macro) and Short (Micro) Trickle patterns. In some embodiments, the duration of rotation in trickle mode may comprise partial rotations of the barrel, so in some instances, the trickle rate is defined according to the angle the barrel is rotated through (for example, 180°, 360°, 720°, 1080°, etc.). Once the dispensed weight reaches the start point for long trickle, it starts long trickle and the energy it gives is slightly lower than slow speed. The rotating time (or angle) for long trickle will be adjusted depending how far it is away from the target weight. When the dispensed weight reaches the start point for short trickle, it starts short trickle and the energy it gives is lower than long trickle. The short trickle is the last trickle operation dispensing to desired target charge. The rotating time for short trickle is fixed and response time (or wait time) is longer than long trickle. That is because it is close to target, and it needs to wait for a weight result before the processor determines to stop or continue short trickles.

The dispensing process continues through blocks 404 to 420 depending on the weight dispensed until W≥T−Z (block 402) is reached, at which the processor on the loader determines that further dispensing will result in an overweight status. The motor is stopped, the final weight is calculated and over/under status is displayed (blocks 422, 424 and 426), ending the LEARN dispensing process for that run. The user empties the receptacle (e.g. into a cartridge) and returns it to the scale pan for the next dispensing run. If the user is satisfied with the results of the LEARN process for the powder and target weight, he may save the profile into memory for future loads, or push the GO button for the loader to run the process for a subsequent dispense. As discussed above, the user may change the target weight and push the GO button for the loader to run the process for the new target weight.

Figure 10:
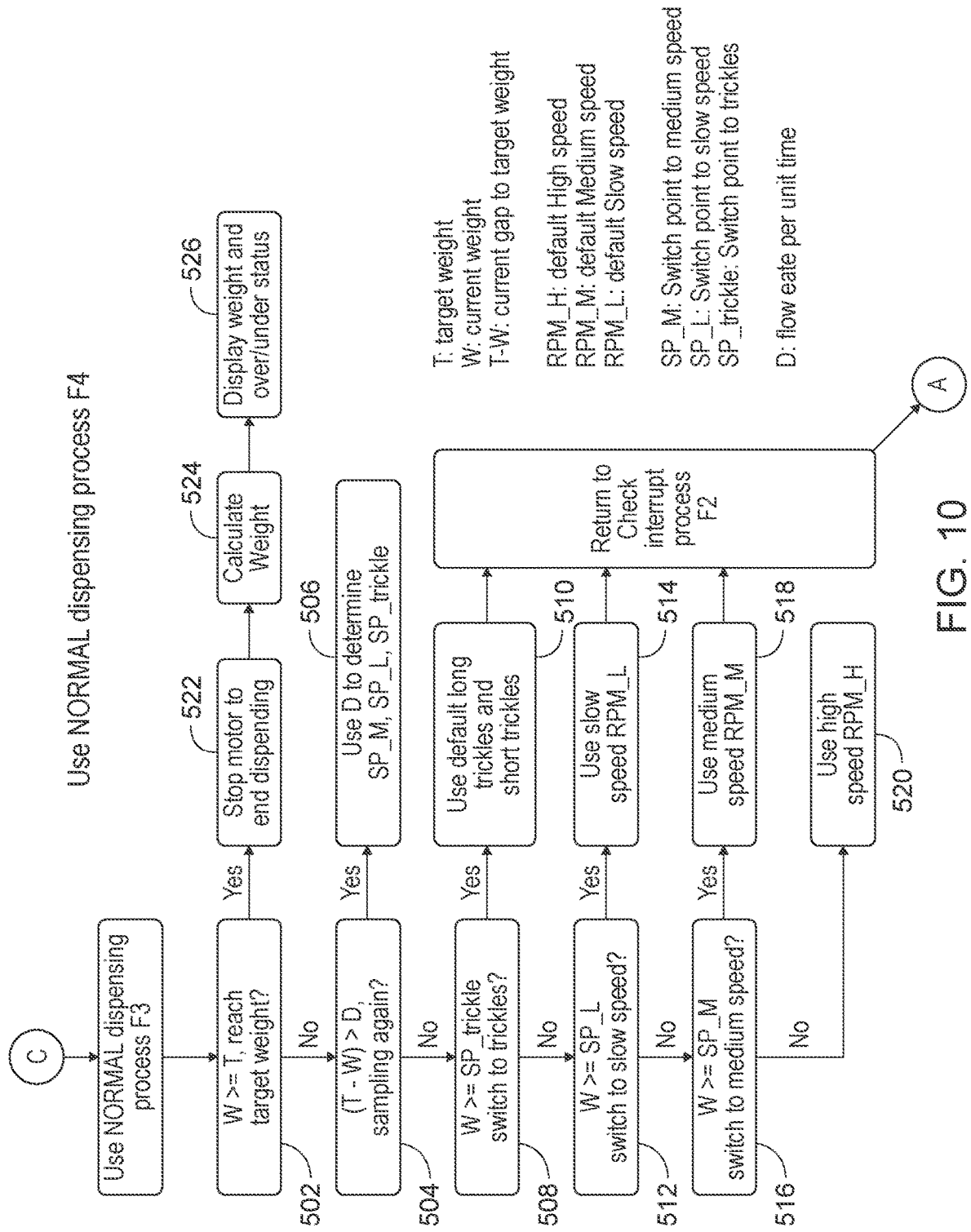

The NORMAL DISPENSING MODE F4 is illustrated in FIG. 10. NORMAL mode uses default speeds, switch points and trickle profiles. The three speeds in NORMAL mode are high (300 rpm), medium (140 rpm) and slow (40 rpm). Note medium and slow speeds are the same for both NORMAL and LEARN.

At step 502, if the weight W is greater than or equal to the target weight T, the motor is stopped to end dispensing, the weight is calculated and the weight is displayed, along with the over/under status.

At step 504, if the difference between the target weight T and the weight W is greater than the flow rate/unit time D, at step 506, the flow rate/unit time D is used to determine the switch points, i.e., SP_M switch point to medium speed, SP_L switch point to slow speed and SP_trickle, switch point to trickles.

At step 508, if the weight W is greater than or equal to SP_trickle, switch point to trickles, then at step 510, a predetermined long/short trickle time is used.

At step 512, if the weight W is greater than or equal to SP_L switch point to slow speed, then at step 514, a predetermined slow speed RPM_L is used.

At step 516, if the weight W is greater than or equal to SP_M switch point to medium speed, then at step 518, a predetermined medium speed RPM_M is used. Otherwise, at step 520, a predetermined high speed RPM_H is used. Thereafter, the process returns to the check interrupt process at step 328.

The dispensing process continues through blocks 504 to 520 depending on the weight dispensed until W≥T−Z (block 502) is reached, at which the loader determines that further dispensing will result in an overweight status. The motor is stopped, the final weight is calculated and over/under status is displayed (blocks 522, 524 and 526), ending the NORMAL dispensing process for that run. The user empties the receptacle (e.g. into a cartridge) and returns it to the scale pan for the next dispensing run. If the user is satisfied with the results of the NORMAL process for the powder and target weight, he may save the profile into memory for future loads, or push the GO button for the loader to run the process for a subsequent dispense. Alternatively, the user may switch to the LEARN mode. As discussed above, the user may change the target weight and push the GO button for the loader to run the process for the new target weight in either LEARN or NORMAL mode.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or action is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

It is understood that the subject matter described herein is not limited to particular embodiments described, as such may, of course, vary. It is also understood that the terminology used herein is for the purpose of describing particular embodiments only, and is not intended to be limiting. Where a range of values is provided, it is understood that each intervening value between the upper and lower limit of that range and any other stated or intervening value in that stated range, is encompassed within the disclosed subject matter.

The invention claimed is:

1. A method for dispensing powder, the method comprising:
   controlling by a processor, at least one motor to rotate a barrel or tube at a first rotational speed for a first predetermined period of time to dispense powder from a hopper in fluid communication with the barrel or tube, through the barrel or tube, and to a receptacle on a scale;

receiving by the processor, from a sensor on the scale, measured weight data comprising a weight of the powder dispensed to the receptacle and receiving, by the processor, the first predetermined period of time; and determining, by the processor, based on the measured weight and the first predetermined period of time, the type of powder dispensed.

2. The method of claim 1, further comprising the processor determining, by the processor, a safe stopping point and a trickle rate regime comprising a long trickle rate and a slow trickle rate based on the determined type of powder.

3. The method of claim 2, further comprising:

receiving by the processor a target weight from a user via a user interface;

controlling, by the processor, the at least one motor to rotate the barrel or tube at one or more speeds to dispense powder based on a difference between the target weight and first, second and third weight parameters, wherein the second weight parameter is smaller than the first weight parameter and the third weight parameter is smaller than the second weight parameter, until the dispensed weight reaches the safe stopping point; and controlling the at least one motor to rotate the barrel or tube at a long trickle rate and a slow trickle rate until the target weight is reached.

4. The method of claim 3, wherein the target weight is greater than the first weight parameter and the method further comprises:

controlling the at least one motor to rotate the barrel or tube at a most effective high speed for dispensing powder, the most effective high speed determined from a dispense rate of powder based on the amount of powder dispensed and the run time for each of a plurality of rotational speeds; and determining, via the processor, switch points to a default medium speed and a default low speed based on the second and third weight parameters.

5. The method of claim 3, wherein the target weight is less than the first weight parameter and greater than the second weight parameter and the method further comprises;

controlling the at least one motor to rotate the barrel or tube at a default medium speed; and determining, via the processor, a switch point to a default low speed based on the second and third weight parameters.

6. The method of claim 4, wherein the target weight is less than the second weight parameter and greater than the third weight parameter and the method further comprises controlling the at least one motor to rotate the barrel or tube at a default slow speed.

7. The method of claim 1, further comprising:

controlling, by the processor, the at least one motor to rotate the barrel or tube at each of a plurality of rotational speeds to dispense powder from the hopper to the receptacle on the scale, wherein the motor is operated at each of the plurality of speeds for a second predetermined period of time;

receiving by the processor measured weight data comprising an amount of powder dispensed to the receptacle for each of the plurality of rotational speeds;

determining, by the processor a dispense rate for each of the plurality of rotational speeds based on the amount of powder dispensed and the run time; and determining, by the processor, based on the determined dispense rate for each of the plurality of rotational speeds, a most effective high speed for dispensing powder; and creating, by the processor, a set of dispense parameters for the determined type of powder.

8. A non-transitory computer readable medium comprising:

a plurality of instructions stored thereon, the plurality of instructions configurable to be executed by a processor such that upon execution the processor is configurable to:

control at least one motor to rotate a barrel or tube at a first rotational speed for a first predetermined period of time to dispense powder from a hopper in fluid communication with the barrel or tube, through the barrel or tub, and to a receptacle on a scale;

receive measured weight data from a sensor on the scale, measured weight data comprising a weight of the powder dispensed to the receptacle; and determine, based on the measured weight and the predetermined period of time, the type of powder dispensed.

9. The non-transitory computer readable medium of claim 8, further comprising instructions to be executed by the processor to determine a safe stopping point and a trickle rate regime comprising a long trickle rate and a slow trickle rate based on the determined type of powder.

10. The non-transitory computer readable medium of claim 9, further comprising instructions to be executed by the processor to:

control the at least one motor to rotate the barrel or tube at each of a plurality of rotational speeds to dispense powder from the hopper to the receptacle on a scale, wherein the motor is operated at each of the plurality of speeds for a second predetermined period of time;

receive by the processor measured weight data comprising an amount of powder dispensed to the receptacle for each of the plurality of rotational speeds;

determine a dispense rate for each of the plurality of rotational speeds based on the amount of powder dispensed and the run time; and determine, based on the determined dispense rate for each of the plurality of rotational speeds, a most effective high speed for dispensing powder; and creating a set of dispense parameters for the determined type of powder.

11. The non-transitory computer readable medium of claim 10, further comprising instructions to be executed by the processor to:

receive a target weight from a user via a user interface;

control the at least one motor to rotate the barrel or tube at one or more speeds to dispense powder based on a difference between the target weight and first, second and third weight parameters, wherein the second weight parameter is smaller than the first weight parameter and the third weight parameter is smaller than the second weight parameter, until the dispensed weight reaches the safe stopping point; and control the at least one motor to rotate the barrel or tube at a long trickle rate and a slow trickle rate until the target weight is reached.

12. The non-transitory computer readable medium of claim 11, wherein the target weight is greater than the first weight parameter, and the non-transitory computer readable medium further comprises instructions to be executed by the processor to:
- control the at least one motor to rotate the barrel or tube at a most effective high speed for dispensing powder, the most effective high speed determined from a dispense rate of powder based on the amount of powder dispensed and the run time for each of a plurality of rotational speeds; and
- determine switch points to a default medium speed and a default low speed based on second and third weight parameters.

13. The non-transitory computer readable medium of claim 11, wherein the target weight is less than first weight parameter and greater than the second weight parameter, and the non-transitory computer readable medium further comprises instructions to be executed by the processor to:
- control the at least one motor to rotate the barrel or tube at a default medium speed; and
- determine a switch point to a default low speed based on the second and third weight parameters.

14. The non-transitory computer readable medium of claim 11, wherein the target weight is less than the second weight parameter and greater than the third weight parameter, and the non-transitory computer readable medium further comprises instructions to be executed by the processor to control the at least one motor to rotate the barrel or tube at a default slow speed.

15. A powder dispensing device comprising:
- a housing;
- a hopper sized and shaped to engage the housing to form a reservoir, a barrel in fluid communication with the reservoir;
- at least one motor coupled to the barrel, the at least one motor configured to rotate barrel;
- a scale electrically coupled to a scale plate, the scale plate disposed on the housing and below the barrel;
- a user interface in electrical communication with the at least one motor and the scale, the user interface configured to receive a user-input; and
- a processor configured to execute computer readable instructions to:
  - control at least one motor to rotate a barrel or tube at a first rotational speed for a first predetermined period of time to dispense powder from a hopper to a receptacle on a scale;
  - receive measured weight data from a sensor on the scale, the measured weight data comprising an amount of powder dispensed to the receptacle;
  - determine, based on the measured weight and the first predetermined period of time, the type of powder dispensed.

16. The powder dispensing device of claim 15 further comprising instructions to be executed by the processor to determine a safe stopping point and a trickle rate regime comprising a long trickle rate and a slow trickle rate based on the determined type of powder.

17. The powder dispensing device of claim 16, further comprising instructions to be executed by the processor to:
- control the at least one motor to rotate the barrel or tube at each of a plurality of rotational speeds to dispense powder from the hopper to the receptacle on a scale, wherein the motor is operated at each of the plurality of speeds is for a second predetermined period of time;
- receive measured weight data comprising an amount of powder dispensed to the receptacle for each of the plurality of rotational speeds;
- determine a dispense rate of powder for each of the plurality of rotational speeds based on the amount of powder dispensed and the run time; and
- determine, based on the determined dispense rate for each of the plurality of rotations speeds, a most effective high speed for dispensing powder.

18. The powder dispensing device of claim 16, further comprising instructions to be executed by the processor to:
- receive a target weight from a user via a user interface;
- control the at least one motor to rotate the barrel or tube at one or more speeds to dispense powder based on a difference between the target weight and first, second and third weight parameters, wherein the second weight parameter is smaller than the first weight parameter and the third weight parameter is smaller than the second weight parameter, until the dispensed weight reaches the safe stopping point; and
- control the at least one motor to rotate the barrel or tube at a long trickle rate, a slow trickle rate or both until the target weight is reached.

19. The powder dispensing device of claim 18, wherein when the target weight is greater than the first weight parameter, further comprising instructions to be executed by the processor to:
- control the at least one motor to rotate the barrel or tube at a most effective high speed for dispensing powder, the most effective high speed determined from a dispense rate of powder based on the amount of powder dispensed and the run time for each of a plurality of rotational speeds; and
- determine switch points to a default medium speed and a default low speed based on second and third weight parameters.

20. The powder dispensing device of claim 18, wherein the target weight is less than the first weight parameter and greater than the second weight parameter, further comprising instructions to be executed by the processor to:
- control the at least one motor to rotate the barrel or tube at a default medium speed; and
- determine a switch point to a default low speed based on the second and third weight parameters.

21. The powder dispensing device of claim 18, wherein the target weight is less than the second weight parameter and greater than the third weight parameter, further comprising instructions to be executed by the processor to control the at least one motor to rotate the barrel or tube at a default slow speed.

* * * * *